(12) United States Patent
Koundinya et al.

(10) Patent No.: US 11,886,453 B2
(45) Date of Patent: Jan. 30, 2024

(54) QUANTIZATION OF DATA STREAMS OF INSTRUMENTED SOFTWARE AND HANDLING OF DELAYED OR LATE DATA

(71) Applicant: SPLUNK Inc., San Francisco, CA (US)

(72) Inventors: Sunil Kittinakere Nagesh Koundinya, Newark, CA (US); Ramakrishnan Hariharan Chandrasekharapuram, San Jose, CA (US); Paul Ingram, Menlo Park, CA (US)

(73) Assignee: SPLUNK Inc., San Francisco, CA (US)

( * ) Notice: Subject to any disclaimer, the term of this patent is extended or adjusted under 35 U.S.C. 154(b) by 0 days.

(21) Appl. No.: 17/515,137

(22) Filed: Oct. 29, 2021

(65) Prior Publication Data
US 2023/0137103 A1  May 4, 2023

(51) Int. Cl.
*G06F 16/2458* (2019.01)
*G06F 16/22* (2019.01)

(52) U.S. Cl.
CPC .......... *G06F 16/2474* (2019.01); *G06F 16/22* (2019.01); *G06F 16/2477* (2019.01)

(58) Field of Classification Search
CPC ... G06F 16/2474; G06F 16/22; G06F 16/2477
USPC ......................................................... 707/769
See application file for complete search history.

(56) References Cited

U.S. PATENT DOCUMENTS

| | | | |
|---|---|---|---|
| 7,937,344 B2 | 5/2011 | Baum et al. | |
| 8,112,425 B2 | 2/2012 | Baum et al. | |
| 8,751,529 B2 | 6/2014 | Zhang et al. | |
| 8,788,525 B2 | 7/2014 | Neels et al. | |
| 9,215,240 B2 | 12/2015 | Merza et al. | |
| 9,286,413 B1 | 3/2016 | Coates et al. | |
| 10,127,258 B2 | 11/2018 | Lamas et al. | |
| 2010/0198862 A1* | 8/2010 | Jennings | H04L 67/54 707/769 |
| 2010/0250497 A1* | 9/2010 | Redlich | H04L 63/105 707/661 |
| 2013/0103658 A1* | 4/2013 | Travis | G06F 16/2477 707/700 |
| 2014/0310714 A1* | 10/2014 | Chan | G06F 16/285 718/102 |

(Continued)

OTHER PUBLICATIONS

Splunk Enterprise 8.0.0 Overview, available online, retrieved May 20, 2020 from docs.splunk.com.

(Continued)

*Primary Examiner* — Hosain T Alam
*Assistant Examiner* — Saba Ahmed
(74) *Attorney, Agent, or Firm* — Kilpatrick Townsend & Stockton LLP

(57) ABSTRACT

Described are systems, methods, and techniques for collecting, analyzing, processing, and storing time series data and for evaluating and determining whether and how to include late or delayed data points when publishing or storing the time series data. Maximum delay values can identify a duration for waiting for late or delayed data, such as prior to publication. In some examples, maximum delay values can be dynamically adjustable based on a statistical evaluation process. For late or delayed data points that are received after the maximum delay elapses, some data points can be included in the stored time series data, such as if they are received in the same order that they are generated.

21 Claims, 10 Drawing Sheets

(56) References Cited

U.S. PATENT DOCUMENTS

2016/0224459 A1     8/2016    Liu et al.
2019/0098106 A1     3/2019    Mungel et al.
2020/0073866 A1*   3/2020    Joyner ................. G06F 16/156

OTHER PUBLICATIONS

Splunk Cloud 8.0.2004 User Manual, available online, retrieved May 20, 2020 from docs.splunk.com.
Splunk Quick Reference Guide, updated 2019, available online at https://www.splunk.com/pdfs/solution-guides/splunk-quick-reference-guide.pdf, retrieved May 20, 2020.
Carraso, David, "Exploring Splunk," published by CITO Research, New York, NY, Apr. 2012.
Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.
Cao , et al., "Timon: A Timestamped Event Database for Efficient Telemetry Data Processing and Analytics", Available Online at https://dl.acm.org/doi/10.1145/3318464.3386136, Jun. 14-19, 2020, pp. 739-753.
Esteves , et al., "Aion: Better Late Than Never in Event-Time Streams", Available Online at https://arxiv.org/pdf/2003.03604.pdf, Mar. 7, 2020, 15 pages.
PCT/US2022/078901 , "International Search Report and Written Opinion", dated Mar. 27, 2023, 17 pages.
PCT/US2022/078901 , "Invitation to Pay Additional Fees and, Where Applicable, Protest Fee", Feb. 6, 2023, 5 pages.

\* cited by examiner

| | DATA POINT RAW TIME (H:M) 202 | APPLICABLE WINDOW 204 | DATA POINT RECEIPT TIME (H:M:S) 206 | MAX DELAY (BASED ON LAST HOUR) 208 | WINDOW PUBLISHING TIME 210 | DELAY FROM END OF APPLICABLE WINDOW 212 |
|---|---|---|---|---|---|---|
| 214 → | 214A → 12:00 | 214B → 12:00-12:01 | 214C → 12:00:18 | 214D → 5S | 214E → 12:01:05 | 214F → 5S |
| | 12:01 | 12:01-12:02 | 12:01:19 | 5S | 12:02:05 | 5S |
| 216 → | 216A → 12:02 | 216B → 12:02-12:03 | 216C → 12:16:18 | 216D → 14M | 216E → 12:17:05 | 216F → 14M |
| | 12:03 | 12:03-12:04 | 12:16:18 | 14M | 12:17:10 | 13M |
| | 12:04 | 12:04-12:05 | 12:16:19 | 14M | 12:17:12 | 12M |
| | 12:05 | 12:05-12:06 | 12:16:20 | 14M | 12:17:14 | 11M |
| | ... | | | | | |
| | 12:16 | 12:16-12:17 | 12:16:21 | 14M | 12:18:05 | 1M |
| | 12:17 | 12:17-12:18 | 12:17:19 | 14M | 12:19:06 | 1M |
| | 12:18 | 12:18-12:19 | 12:18:19 | 14M | 12:20:07 | 1M |
| | 12:19 | 12:19-12:20 | 12:19:18 | 14M | 12:21:05 | 1M |
| | 12:20 | 12:20-12:21 | 12:20:18 | 14M | 12:22:05 | 1M |
| | 12:21 | 12:21-12:22 | 12:21:19 | 14M | 12:23:05 | 1M |
| | 12:22 | 12:22-12:23 | 12:22:20 | 14M | 12:24:05 | 1M |
| | 12:23 | 12:23-12:24 | 12:23:18 | 14M | 12:25:06 | 1M |
| 218 → | 218A → 12:24 | 218B → 12:24-12:25 | 218C → 12:24:19 | 218D → 14M | 218E → 12:26:06 | 218F → 1M |
| | 12:25 | 12:25-12:26 | 12:25:19 | 14M | 12:27:06 | 1M |
| | ... | | | | | |
| | 12:59 | 12:59-01:00 | 12:59:18 | 14M | 01:01:05 | 1M |
| | 01:00 | 01:00-01:01 | 01:00:19 | 14M | 01:02:05 | 1M |
| | DELAY RESET 220 | | | | | |
| | 01:01 | 01:01-01:02 | 01:01:18 | 5S | 01:02:05 | 5S |
| | 01:02 | 01:02-01:03 | 01:02:18 | 6S | 01:03:06 | 6S |
| | 01:03 | 01:03-01:04 | 01:03:19 | 6S | 01:04:06 | 6S |

| DATA POINT RAW TIME (H:M) 102 | APPLICABLE WINDOW 204 | DATA POINT RECEIPT TIME 206 | ADJUSTED MAX DELAY VALUES 308 | WINDOW PUBLISHING TIME 210 | DELAY FROM END OF APPLICABLE WINDOW 212 |
|---|---|---|---|---|---|
| 314A → 12:00 | 314B → 12:00-12:01 | 314C → 12:00:18 | 314D → 5s | 314E → 12:01:05 | 314F → 5s |
| 12:01 | 12:01-12:02 | 12:01:19 | 5s, 5s | 12:02:05 | 5s |
| 316A → 12:02 | 316B → 12:02-12:03 | 316C → 12:16:18 | 316D → 5s, 5s, 14M | 316E → 12:17:05 | 316F → 14M |
| 12:03 | 12:03-12:04 | 12:16:18 | 5s, 13M, 14M | 12:17:10 | 13M |
| 12:04 | 12:04-12:05 | 12:16:19 | 12M, 13M, 14M | 12:17:12 | 12M |
| 12:05 | 12:05-12:06 | 12:16:20 | 12M, 13M, 14M | 12:17:14 | 11M |
| ... | | | | | |
| 12:16 | 12:16-12:17 | 12:16:21 | 12M, 13M, 14M | 12:17:20 | 20s |
| 12:17 | 12:17-12:18 | 12:17:19 | 12M, 13M, 14M | 12:18:06 | 6s |
| 12:18 | 12:18-12:19 | 12:18:19 | 318 → 7s, 12M, 13M | 12:19:07 | 7s |
| 12:19 | 12:19-12:20 | 12:19:18 | 7s, 12M, 13M | 12:20:05 | 5s |
| 12:20 | 12:20-12:21 | 12:20:18 | 5s, 7s, 12M | 12:21:05 | 5s |
| 12:21 | 12:21-12:22 | 12:21:19 | 5s, 7s, 12M | 12:22:05 | 5s |
| 12:22 | 12:22-12:23 | 12:22:20 | 5s, 7s, 12M | 12:23:05 | 5s |
| 12:23 | 12:23-12:24 | 12:23:18 | 5s, 7s, 12M | 12:24:06 | 6s |
| 320A → 12:24 | 320B → 12:24-12:25 | 320C → 12:24:19 | 320D → 5s, 6s, 7s | 320E → 12:25:06 | 320F → 6s |
| 12:25 | 12:25-12:26 | 12:25:19 | 5s, 6s, 7s | 12:26:06 | 6s |
| ... | | | | | |
| 12:59 | 12:59-01:00 | 12:59:18 | 5s, 6s, 7s | 01:00:05 | 5s |
| 01:00 | 01:00-01:01 | 01:00:19 | 5s, 6s, 7s | 01:01:05 | 5s |
| DELAY RESET 220 | | | | | |
| 01:01 | 01:01-01:02 | 01:01:18 | 5s | 01:02:05 | 5s |
| 01:02 | 01:02-01:03 | 01:02:18 | 5s, 6s | 01:03:06 | 6s |
| 01:03 | 01:03-01:04 | 01:03:19 | 5s, 6s, 6s | 01:04:06 | 6s |

FIG. 3

UPDATE WEIGHTED MOVING AVERAGE (AVG) AND VARIANCE (VAR)

602: DELTA = DELAY - AVG
604: AVG = AVG + (DELTA * ALPHA)
606: VAR = (1 - ALPHA) * (VAR + ALPHA * DELTA * DELTA)

FIG. 6A

IF THE CURRENT DELAY >= MIN(DELAY1, DELAY2, DELAY3), UPDATE THE SMALLEST DELAY WITH A TTL

608: ZSCORE = (DELAY - AVG) / SQRT(VAR)
610: TTL = MAXEXPIRYTIME / MAX(1, ZSCORE)
612: IF TTL < MINEXPIRYTIME:
       TTL = MINEXPIRYTIME
614: UPDATEDELAY(DELAY, TTL)

FIG. 6B

| POINT NUMBER 918 | DATA POINT RAW TIME (H:M:S) 902 | ASSIGNED WINDOW 904 | WINDOW CLOSE TIME 906 | WINDOW PUBLISHING TIME 908 | DATA POINT RECEIPT TIME 910 | LATE? 912 | IN-ORDER OR OUT-OF-ORDER? 914 | ADD TO WINDOW OR DROP? 916 |
|---|---|---|---|---|---|---|---|---|
| 1 | 12:00:00 | 12:00:00-12:00:05 | 12:00:07 | 12:00:08 | 12:00:01 | NO | IN-ORDER | ADD |
| 2 | 12:00:01 | 12:00:00-12:00:05 | 12:00:07 | 12:00:08 | 12:00:02 | NO | IN-ORDER | ADD |
| 3 | 12:00:02 | 12:00:00-12:00:05 | 12:00:07 | 12:00:08 | 12:00:04 | NO | IN-ORDER | ADD |
| 4 | 12:00:03 | 12:00:00-12:00:05 | 12:00:07 | 12:00:08 | 12:00:06 | NO | IN-ORDER | ADD |
| 5 | 12:00:04 | 12:00:00-12:00:05 | 12:00:07 | 12:00:08 | 12:00:05 | NO | OUT-OF-ORDER | ADD |
| 6 | 12:00:05 | 12:00:05-12:00:10 | 12:00:12 | 12:00:13 | 12:00:07 | NO | IN-ORDER | ADD |
| 7 | 12:00:06 | 12:00:05-12:00:10 | 12:00:12 | 12:00:13 | 12:00:07 | NO | IN-ORDER | ADD |
| 8 | 12:00:07 | 12:00:05-12:00:10 | 12:00:12 | 12:00:13 | 12:00:08 | NO | IN-ORDER | ADD |
| 9 | 12:00:08 | 12:00:05-12:00:10 | 12:00:12 | 12:00:13 | 12:00:16 | YES | IN-ORDER | ADD |
| 10 | 12:00:09 | 12:00:05-12:00:10 | 12:00:12 | 12:00:13 | 12:00:17 | YES | IN-ORDER | ADD |
| 11 | 12:00:10 | 12:00:10-12:00:15 | 12:00:17 | 12:00:18 | 12:00:19 | YES | IN-ORDER | ADD |
| 12 | 12:00:11 | 12:00:10-12:00:15 | 12:00:17 | 12:00:18 | 12:00:18 | YES | IN-ORDER | ADD |
| 13 | 12:00:12 | 12:00:10-12:00:15 | 12:00:17 | 12:00:18 | 12:00:20 | YES | OUT-OF-ORDER | DROP |
| 14 | 12:00:13 | 12:00:10-12:00:15 | 12:00:17 | 12:00:18 | 12:00:21 | YES | IN-ORDER | ADD |
| 15 | 12:00:14 | 12:00:10-12:00:15 | 12:00:17 | 12:00:18 | 12:00:21 | YES | IN-ORDER | ADD |
| ⋮ | | | | | | | | |

FIG. 9

QUANTIZATION OF DATA STREAMS OF INSTRUMENTED SOFTWARE AND HANDLING OF DELAYED OR LATE DATA

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data").

In some examples, machine data may be generated by software or based on physical parameters associated with a computing system on which the software is operating. For example, machine data can include log data, performance data, diagnostic data, metrics, tracing data, or any other data that can be analyzed to diagnose equipment performance problems, monitor user interactions, and to derive other insights.

Monitoring certain machine data in real-time or near real-time may be desirable for some applications. For example, it may be useful to monitor performance data or metrics, such as processor usage or memory usage, in real-time to allow for identification of problems as they occur. Tracking machine data in real-time or over various time periods (e.g., hours, days, weeks, months) can also allow for identification of patterns and can be useful for scaling resources, for example. In some cases, it can be useful to consolidate or compile machine data generated in real-time (e.g., every second) over longer periods (e.g., minutes, hours, days, etc.) to allow for easier visualization and interpretation or analysis of the machine data.

SUMMARY

Techniques, which may be embodied herein as systems, computing devices, methods, algorithms, software, code, computer readable media, or the like, are described herein for collecting, analyzing, processing, and storing time series data and for evaluating time series data, such as by a data quantizer system. The data quantizer system may optionally quantify, qualify, or otherwise indicate the occurrence of events based on evaluation of the time series data. The time series data may comprise machine data, which may correspond to sensor data, processing data, resource use data, network data, program data, or other computer-generated or derived data that may indicate software, hardware, network, performance, or other characteristics. The time series data may be generated in real time by one or more data sources, which can relay data points to the data quantizer system on a repeated basis and the data quantizer system can roll-up, bucket, or otherwise aggregate multiple data points on a fixed time interval, which can be published, stored, or communicated.

In some examples, described in further detail herein, time series data points from a data source may be received at a data quantizer system after some amount of delay after the data points are generated. Such delay may be associated with a network latency, for example, but delays are not so exclusively limited. In some cases, the delays may be considerable and the techniques described herein provide for determining whether and how to include late or delayed data points when publishing or storing the time series data. In some examples, maximum delay values can identify a duration for waiting for late or delayed data, such as prior to publication. In some examples, maximum delay values can be dynamically adjustable based on a statistical evaluation process. For late or delayed data points that are received after the maximum delay elapses, some data points can be included in the stored time series data, such as if they are received in the same order that they are generated.

In one aspect, techniques are described herein for dynamically adjusting a max delay in publishing data points for a time series of data points, including computer-implemented methods, systems or computing devices, and non-transitory computer readable media. In some examples, a method of this aspect may comprise receiving a first data point of a time series of data points. The first data point can include a first data point raw time indicating a time of creation of the first data point and a first receipt time indicating a time for which the first data point is obtained at the data quantizer system. A first receipt delay time can also be derived for the first data point. The first receipt delay time can comprise a delay between the first receipt time and the first data point raw time.

Responsive to determining that the first receipt delay time is greater than any of a set of maximum delay values for the time series of data points a first time to live value can be derived. The first time to live value can specify a time for the first receipt delay time to be included in the set of maximum delay values. A greater deviance between the first receipt delay time and a weighted moving average delay for the time series of data points can reduce the first time to live value. The set of maximum delay values can further be updated to include the first receipt delay time and the first time to live value. The first data point can be published to a streaming analytics engine at a time after an end of a first applicable window.

The method can also include receiving a second data point. The second data point can include a second data point raw time indicating a time of creation of the second data point and a second receipt time indicating a time for which the second data point is obtained at the data quantizer system. A second receipt delay time can be derived for the second data point. The second receipt delay time can include a delay between the second data point raw time and the second data point raw time.

Responsive to determining that the first time to live value associated with the first receipt delay time has expired, a second time to live value based on the second receipt delay time can be derived. Further, the set of maximum delay values can be updated to add the second receipt delay time and the second time to live value to the set of maximum delay values and remove the first receipt delay time included in the set of maximum delay values. The second data point can be published to the streaming analytics engine at a time after an end of a second applicable window.

In another aspect, techniques are described herein for using late data points when computing roll-up data points, such as data points received after the expiration of a max delay value, including computer-implemented methods, systems or computing devices, and non-transitory computer readable media. In some examples, a method of this aspect may comprise receiving a first data point of a time series of data points, the first data point having a first data point raw time and received at a first data point receipt time; identifying a first roll-up window for the first data point based on the first data point raw time; determining that the first data point is received after the first roll-up window is closed; determining that the first data point is received in an in-order condition based on at least the first data point receipt time; generating a first roll-up data point for the first roll-up window using the first data point; and storing the first roll-up data point to one or more non-transitory data storage devices.

Roll-up data points may be published, such as by storing to a data storage device or by transmitting to a streaming analytics system, for example. Optionally, methods of this aspect may further comprise storing the first data point to the one or more non-transitory data storage devices. Optionally, methods of this aspect may further comprise publishing the first roll-up data point generated using the first data point. Depending on the particular configuration, however, publication may occur before a late data point is received, and so some methods of this aspect may optionally comprise, prior to receiving the first data point, generating the first roll-up data point for the first roll-up window without using the first data point; and publishing the first roll-up data point generated without using the first data point.

A roll-up window being in a closed condition may indicate that a time period for receiving additional data points in the roll-up window has completed. Such a condition may occur after a max delay time following the roll-up window has elapsed, which may indicate a close time for the roll-up window. In some examples, determining that the first data point is received after the first roll-up window is closed comprises determining that the first data point receipt time is later than a close time for the first roll-up window.

Data points may be received in-order or out-of-order. In-order data may correspond to data points that are received in the same order in which the data points are generated, for example. Out-of-order data points may correspond to data points that are received after an earlier generated data point is received. In some cases, data points being in-order or out-of-order may not be critical, such as for data points that are received while the roll-up window is open. However, when a roll-up window is closed for receiving additional data points, late received data points may, in some cases, be added to a closed roll-up window if they are received in order. In some examples, determining that the first data point is received in an in-order condition comprises determining that the first raw time is later than all other raw times for all other received data points of the time series of data points; or determining that no other raw time for any other received data point of the time series of data points are later than the first raw time.

In other cases, late received data points may be out-of-order. In some examples, a method of this aspect may further comprise receiving a second data point of the time series of data points, the second data point having a second data point raw time and received at a second data point receipt time; identifying a second roll-up window for the second data point based on the second data point raw time; determining that second data point is received after the second roll-up window is closed; determining that the second data point is received in an out-of-order condition based on the second data point raw time and the second data point receipt time; generating a second roll-up data point for the second roll-up window without using the second data point; and storing the second roll-up data point to the one or more non-transitory data storage devices. In some examples, determining that the second data point is received in an out-of-order condition may comprise determining that the second raw time is earlier than at least one other raw time for any other received data points of the time series of data points.

As noted above, data points received while an assigned roll-up window is open may not implicate needing to evaluate whether the data point is late. In some examples, a method of this aspect may further comprise receiving a second data point of the time series of data points, the second data point having a second data point raw time and received at a second data point receipt time; identifying a second roll-up window for the second data point based on the second data point raw time; determining that second data point is received while the second roll-up window is open; generating a second roll-up data point for the second roll-up window using the second data point; and storing the second roll-up data point to the one or more non-transitory data storage devices. A roll-up window being open may indicate that a max delay value associated with the window may not have elapsed or that the time is before the close time for the window. In some examples, determining that the second data point is received while the second roll-up window is open comprises determining that the second data point receipt time is earlier than a close time for the second roll-up window.

It will be appreciated that the above described aspects may be implemented as methods, systems, computing devices, and/or non-transitory computer readable media. For example, a system or computing device may comprise one or more processors and a non-transitory computer-readable storage medium having stored thereon instructions that, when executed by the one or more processors, may cause the one or more processors to perform operations, such as operations corresponding to methods described herein. In another example, a non-transitory computer-readable storage medium may comprise or have stored thereon instructions that, when executed by the one or more processors, may cause the one or more processors to perform operations, such as operations corresponding to methods described herein.

The term embodiment and like terms are intended to refer broadly to all of the subject matter of this disclosure and the claims below. Statements containing these terms should be understood not to limit the subject matter described herein or to limit the meaning or scope of the claims below. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim. Other objects and advantages will be apparent from the below detailed description including non-limiting examples.

BRIEF DESCRIPTION OF THE DRAWINGS

Illustrative examples are described in detail below with reference to the following figures:

FIG. 2 provides an example table of time series data points with a max delay duration updated based on a fixed time duration.

FIG. 3 provides an example table of time series data points with a max delay duration updated dynamically.

FIG. 6A provides an overview of an example process derive a weighted moving average delay and a delay variance for time series data points.

FIG. 6B provides an overview of an example process for deriving a time to live value for a data point to be included in a set of maximum delay values.

FIG. 9 provides an example table of time series data points showing evaluation of late received data points.

DETAILED DESCRIPTION

Embodiments described herein are useful for analyzing, visualizing, organizing, or otherwise using machine data, such as for purposes of determining the state or condition of a system. For example, machine data can be raw machine data that is generated by various components in IT environments, such as servers, sensors, routers, mobile devices, Internet of Things (IoT) devices, etc. Machine data can include log data, network packet data, sensor data, application program data, error log data, stack trace data, performance data, metrics, tracing data, diagnostic data, and many other types of data.

The machine data may be organized as time series data, where each data point may have or be associated with one or more times or timestamps, such as a raw time, a receipt time, a publication time, etc., one or more values, such as a numerical measurement that can change over time (e.g., processor usage, network latency, total transactions or transactions per unit time, etc.), and optionally metadata, such as one or more identifiers, dimensions, tags, labels, or other custom properties that may indicate characteristics of or associated with the data that may or may not change over time (e.g., a metric name or metric type of the data point, a server IP address or hostname, etc.). In some implementations, a set of time series data associated with the same metric name and dimensions may be referred to as a metric time series or MTS. Metric time series and other time series data may be used for various applications, such as for identification of patterns or anomalies.

1.0. Data Stream Quantization

Figure 1:
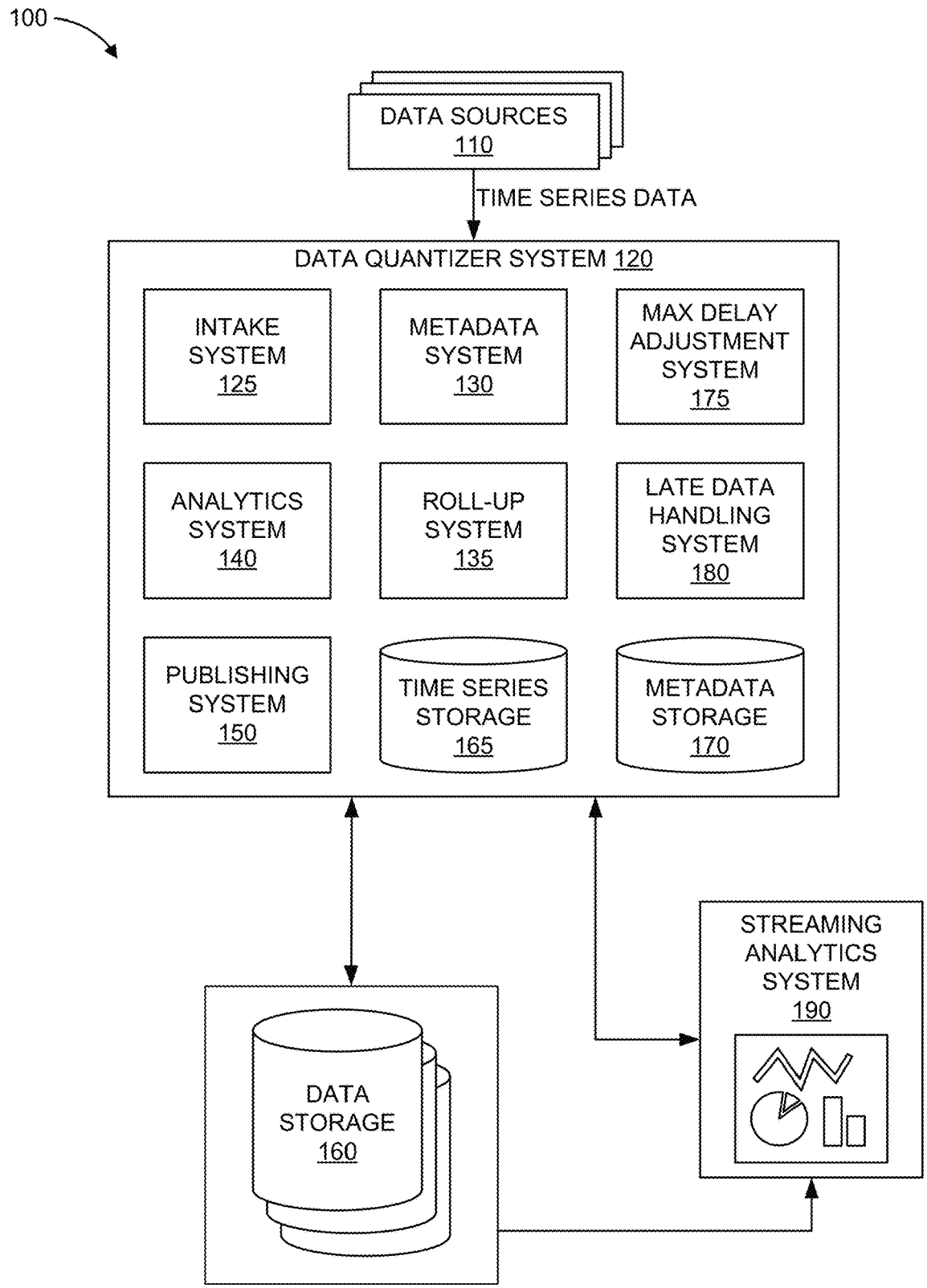
FIG. 1 provides a block diagram of an embodiment of an environment for collecting, analyzing, processing, and storing time series data.

FIG. 1 shows an overview of an example environment 100 for collecting, analyzing, processing, and storing time series data. Time series data may be generated in real time by various data sources 110, which may be distributed across various networks. These data sources 110 may transmit the time series data to a data quantizer system 120, such as over a network, which may include a private network, a wide area network, or a public network (e.g., the Internet). In some cases, the data quantizer system 120 may be at a location remote from the data sources 110, though in some cases the data quantizer system 120 and one or more data sources 110 may be at a common location, and optionally on the same local network. The time series data may include data points that are generated on a repeated basis, which may be a periodic basis (e.g., every second, every minute, etc.) or on a non-periodic basis (e.g., when a generation threshold is reached, upon system reboot, etc.). As illustrated, the data quantizer system 120 may include various subsystems or components, such as an intake system 125, a metadata system 130, a roll-up system 135, an analytics system 140, a publishing system 150, a time series storage 165, a metadata storage 170, a max delay adjustment system 175, and a late data handling system 180.

The data sources 110 may be any suitable computing devices, sensors, software systems, etc., that can generate or collect machine data or other data and transmit the machine data or other data in the form of time series data to the data quantizer system 120, such as over one or more network connections. The data sources 110 can include hosted or containerized software or services operating on cloud infrastructure, where computing resources are shared between multiple hosted software or services. The data sources 110 can be present in a single location or data center or distributed among various data centers, which may be located remotely from one another.

The time series data generated by the data sources 110 may include one or more data points. Each data point can be associated with a raw time that can correspond to a timestamp indicating when a data point is generated by a data source 110, a time at which a data point is transmitted by a data source 110, and/or some other time assigned to the data point by the data source 110.

The data quantizer system 120 may ingest or intake the time series data using the intake system 125. The intake system 125 can receive the time series data from the data sources 110 and assign a receipt time to the data points in the time series data based on a time at which the data points are received, which is generally different from the raw time associated with the data points, since there is usually some latency associated with transmitting the data point to the data quantizer system 120 over a network. In some cases, however, a raw time and a receipt time may be the same, such as if network latency is low and/or if the precision of the raw time and/or receipt time is larger than the network latency (e.g., when the raw time and the receipt time have a precision of 1 second and network latency is less than 100 ms). The intake system 125 may remove extraneous information from the time series data, as desired, and may adjust or format the time series data to a standard format used by the data quantizer system 120, if not already so formatted.

The metadata system 130 may optionally create or assign metadata (e.g., identifiers, dimensions, tags, labels, or the like), to the data points, such as if such metadata is not already assigned or present in the data points or if the metadata system 130 is otherwise assigned to or has rules indicating such metadata is to be assigned. The metadata system 130 may retrieve from or store metadata information to metadata storage 170. Optionally, metadata storage 170 may store an index or rules for associating various metadata with various time series data or components thereof.

The roll-up system 135 may process received data points to as to transform the data values in the received data points to roll-up data points including quantized values associated with one or more regular time intervals. The regular time intervals may be as small as time intervals associated with the received data points but may also be larger, such that multiple values for multiple data points can be combined to generate a quantized value. For example, the received data points may be associated with a time interval of 0.1 seconds, such that 10 data points are received by data quantizer system 120 each second; the roll-up data points may be generated for every 1 second, every 5 seconds, every 15 seconds, every minute, etc., on an ongoing basis. Assuming all data points are received and included in the combination for generating roll-up data points, each 1 second roll-up data point may have a quantized value generated from values for 10 data points. Similarly, each 5 second roll-up data point may have a quantized value generated from values for 50 data points, each 15 second roll-up data point may have a quantized value generated from values for 150 data points, and each minute roll-up data point may have a quantized value generated from values for 600 data points.

When combining values from multiple data points to generate a quantized value for a roll-up data point, any desirable technique may be used. In some cases, the quantized value may correspond to a sum of the data values. In some cases, the quantized value may correspond to a statistical measure of the data values, such as an average or standard deviation. In some cases, a formula or algorithm may be used for computing quantized values from a plurality of data values. Roll-up system 135 may store roll-up data, such as in the form of time series data, to time series storage 165.

To determine which data points may be combined for generating roll-up data points, each roll-up data point may be associated with a roll-up window. A roll-up window may correspond to a time period with a length of the time interval for the roll-up. Data points having a raw time falling in the roll-up window may be assigned to the roll-up window and data points having a raw time outside of the roll-up window may be assigned to another roll-up window. In one example, a 1 minute roll-up data point may have a 1 minute roll-up window that starts at 12:00:00 and ends at 12:01:00, such that any data points having a raw time between 12:00:00 and 12:01:00 may be assigned to the 12:00:00-12:01:00 window. In some cases, the lower end point may be inclusive while the upper end point may be exclusive (e.g., a data point with a raw time of 12:00:00 will be assigned to the 12:00:00-12:01:00 window and a data point with a raw time of 12:01:00 will be assigned to the 12:01:00-12:02:00 window and not the 12:00:00-12:01:00 window). In some cases, the lower end point may be exclusive while the upper end point may be inclusive (e.g., a data point with a raw time of 12:01:00 will be assigned to the 12:00:00-12:01:00 window and a data point with a raw time of 12:02:00 will be assigned to the 12:01:00-12:02:00 window and not the 12:02:00-12:03:00 window). Other end point assignment variations are possible.

In some cases, it may be desirable to combine or associate different time series with one another, such as for various analytics purposes. Analytics system 140 may be used to generate, combine, or otherwise aggregate data from one or multiple different time series to generate an aggregated time series that may be grouped over a common attribute (e.g., a metadata attribute). Optionally, the time series used by the analytics system 140 to generate an aggregated time series may include roll-up data points as generated using roll-up system 135, as described above. In some examples, one time series may include data points with values for processor usage for a particular processor core and a second time series may include data points with values for processor usage for another processor core, and it is desired to determine an overall total or average processor core usage. As another example, multiple time series (e.g., including roll-up data at a fixed time interval or roll-up window) may include data points for processor usage for various processors in a particular data center and it may be desired to have a time series including an overall total or average processor usage for the data center. The analytics system 140 can identify the time series that include metadata identifying the particular data center and determine a sum or average of the processor usage for all the identified time series on a per time interval or roll-up window basis to generate aggregated data points for an aggregated time series representing the overall total or average processor usage for the data center. The analytics system 140 may optionally store the aggregated time series to time series storage 165. In some examples, the analytics system 140 may optionally receive input identifying aggregated time series to generate and then generate such aggregated time series in response.

As time series data from data sources 110 is received by data quantizer system 120 on a continuing basis, the intake system 125, metadata system 130, roll-up system 135, and/or analytics system 140 may perform the above-described aspects repeatedly and optionally in real-time as additional data points are received. As the roll-up data, optionally including aggregated data, is generated, it may be desirable to publish the data, such as by transmitting the roll-up data to a remote system or by storing the roll-up data to long term storage. For example, a publishing system 150 may publish time series data (e.g. roll-up data) by transmitting to streaming analytics system 190 or storing the data to data storage 160. The publishing system 150 may transmit or store the data in real-time or near-real-time, such as according to a publication schedule. In some examples, the publication schedule may indicate a roll-up data point or an aggregated data point is to be published at some time after a roll-up window associated with the data point ends. Optionally, the publication time may be a fixed time duration after a roll-up window ends, such as 5 seconds. In some examples, however, the publication time may be variable and determined on an ongoing basis depending on various conditions, as described in further detail below. Optionally, publishing system 150 can retrieve stored time series data from data storage 160 and transmit to streaming analytics system 190, or otherwise cause stored time series data stored at data storage 160 to be transmitted to streaming analytics system 190.

Since data point raw times and receipt times may be different, some data points may be received after the roll-up window that the data point is assigned to, based on the raw time, ends. In some examples, such data points may be referred to herein as late data points. For example, a data point with a raw time of 12:01:59 may be assigned to a 1 minute roll-up window of 12:01:00-12:02:00, but be received at 12:02:00 (or later). It may be desirable to use such a data point when determining the roll-up data value for the 12:01:00-12:02:00 roll-up window even though the data point was received after the 12:01:00-12:02:00 roll-up window ends. The late data handling system 180 may be used in conjunction with the roll-up system 135 to add appropriate late data points when computing a roll-up data point for a roll-up window.

For example, in some cases, if a data point with a raw time falling in a roll-up window is received after the roll-up window ends but before the roll-up data point for the roll-up window is published, the roll-up system 135 can include the data point in the assigned roll-up window and use the data point when computing the roll-up data point. In terms of including such data points in a roll-up window, the roll-up window may be described as "opening" at the start of the roll-up window and "closing" at the time at which data points should be received by in order to be included. The closing time or, stated another way, time at which the roll-up window closes can optionally be the end of the roll-up window or can be some extra amount of time after the roll-up window ends. The extra amount of time after the end of a roll-up window for which a late data point may still be added to the roll-up window may be referred to herein as a "max delay." In some cases, the max delay may be a fixed amount of time. Optionally, the max delay may be the same as a publication delay. However, these are just examples and need not be the case. Embodiments are contemplated and described below where the max delay changes over time. The max delay adjustment system 175 can be used to adjust the length of the max delay, such as based on one or more conditions. Further, other conditions may dictate a desirability for including late received data points in a closed roll-up window (e.g., even after a max delay duration completes following the end of the roll-up window). For example, in some cases, late data points that are received in an in-order condition may be included when computing roll-up data points for a closed roll-up window, as described in more detail below.

The streaming analytics system 190 can be used to visualize and monitor conditions and/or machine data associated with or generated by the various data sources 110, such as in the form of time series data that is collected and quantized into roll-up data points by the data quantizer system 120. In some cases, the streaming analytics system 190 can enable identification of problems, errors, or undesired performance associated with one or more of the data sources 110 in real-time or near real-time, allowing for troubleshooting and resolution of such issues while minimizing downtime. For example, the time series data may comprise a processing load on each of the data sources 110, such as data sources that correspond to a plurality of servers distributed across a plurality of data centers. The data quantizer system 120 can correlate and roll-up the time-series data for different servers in different data centers, for example, and publish the roll-up data points to the streaming analytics system 190, which can monitor the processing usage on a per-data center basis, for example. In one example, the streaming analytics system 190 can identify a change in processing usage at a particular data center, which can indicate that insufficient resources may be allocated or that a software fault or operational problem may exist at the data center or with one or more of the servers. In some cases, the streaming analytics system 190 can generate a notification or alert, such as based on a trigger condition (e.g., a threshold value in the time series data) being met. Optionally, the streaming analytics system 190 can generate reports based on the time series data. For example, the streaming analytics system 190 can generate reports indicating processing usage for a particular duration (e.g., hours, days, weeks, or months), for one or more data centers or one or more servers, optionally indicating trends, for example. In some cases, the streaming analytics system 190 can obtain historical time series data, such as from the data storage 160, for purposes of visualization, report generation, issue analysis, or the like.

The streaming analytics system 190 may include software applications that permit users to interact with the data quantizer system 120, such as for purposes of selection of time series data to be published to the streaming analytics system 190, specification or assignment of metadata, identification of alert conditions or triggers, on-demand report generation, selection of automatic report generation based on trigger or threshold conditions, or the like. In some embodiments, the software application can be an internet browser, which may include client side code (e.g., Java Script) for accessing the data quantizer system 120. In some embodiments, the software application is a proprietary application developed for interacting with the data quantizer system 120.

2.0. Adjustment of Max Delay to Accommodate Late Data Points

As described above, the data quantizer system 120 can include a max delay adjustment system 175. The max delay adjustment system 175 can utilize statistical models to dynamically modify a set of maximum delay values for a time stream of data points. For example, if a data point is received at the data quantizer system comprising a delay (e.g., a receipt time for the data point that occurs after the end of an applicable window for that data point), a set of maximum delay values can be updated to include the delay for the data point along with a time to live value derived from a statistical model utilizing a weighted moving average and variance in delays for the time series of data points. The time to live value can cause expiration of the delay for a data point to be removed from the set of maximum delay values. This can allow for dynamic adjustment of the maximum delay for the time series of data points, as anomalous delay values for data points are removed from a set of maximum delay values.

In many cases, systems can assign static delay value with a time series of data points. In these cases, as a delay for each data point is calculated, a greatest delay time can be assigned as the maximum delay for the time series of data points. However, in instances where a large delay is identified (e.g., a 14 minute delay when a previous average delay time is 5 seconds), the maximum delay can include the large delay value. Accordingly, in such cases, the maximum delay can comprise such a large value for a specified time duration (e.g., one hour). A static maximum delay value can impact a balance between timeliness (e.g., promptly publishing data to a streaming analytics system) and completeness (e.g., providing a maximum amount of data points to be published to the streaming analytics system. The static maximum delay can modify the balance between timeliness and completeness, as a large maximum delay value can undesirably favor completeness over timeliness by delaying publishing of data points, for example.

The present embodiments provide for a dynamically adjustable maximum delay value for a time series of data points. The data quantizer system can efficiently balance timeliness and completeness in publishing data points by adjusting a maximum delay values near an average delay for the time series of data points. Responsive to an increase in a delay, the data quantizer system can utilize a statistical model to derive a time to live for the delay to be included in a set of maximum delays, which can efficiently bring a maximum value near an average delay to maximize the data points being published to a streaming analysis system.

2.1. Example Illustrating Maximum Delay Behavior in a Data Quantizer System

As described above, a maximum delay can be associated with each time series of data points. FIG. 2 provides a first example table 200 for publishing data points in a time series of data points. The first example table 200 as described with FIG. 2 provides a static maximum delay value as is provided in some cases. The static maximum delay value can comprise a greatest detected delay value for the data points of a time series of data points.

As shown in FIG. 2, the first table 200 provides a series of data points included in a time series of data points (e.g., data points 214, 216, 218). Each data point of the time series of data points can relate to a measurement or metric. For example, the time series of data points can represent a CPU utilization for a machine or a number of processing tasks processed during a time duration. The time series of data points can be published to a streaming analytics engine for near real-time graphical representation of one or more measurements/metrics.

As each data point is obtained, the data quantizer system can identify metadata associated with each data point. For instance, the data quantizer system can identify a data point raw time 202 for each data point. The data point raw time 202 can include a time that the data point is created or assigned a timestamp. For instance, the data point raw time 202 for each data point can be assigned at a client computer prior to providing the data point to the data quantizer system. As an example, a first data point raw time 214a can include a time (in a hour:minute format) of 12:00, indicating a time when the data point was created. The data points can be assigned data point raw times 202 at any frequency as the data points are created by the client device.

Further, the data quantizer system can identify other applicable data relating to each data point. For instance, an applicable window 204 can be identified for each data point. The applicable window 204 can include a time duration in which data with a corresponding data point raw time 202 falls within the applicable window. The applicable window 204 can include any of a variety of time durations, such as 1 minute, 5 minutes, 1 hour, etc.

As an example, a first applicable window 214b can include a time between 12:00 and 12:01. In this example, as a first data point raw time 214a comprises 12:00, the first data point falls within the applicable window 214b. The data quantizer system can aggregate all data points with a raw time 202 falling within the applicable window 204 to be published at a window publishing time 210.

The data point receipt time 206 can include a time (in a hour:minute:second format) that the data point is received at the data quantizer system. As a first example, a first data point can have a data point raw time 214a of 12:00 and a data point receipt time 214c of 12:00:18, which comprises an 18 second delay from creation of the data point to the receipt of the data point at the data quantizer system. In this example, the first data point can be included in the applicable window 214b and can be published at the window publishing time 214e.

In another example, the data point receipt time 206 can occur after the end of the applicable window 204. For instance, a second data point can include a data point raw time 216a of 12:02 and an applicable window 216b of 12:02-12:03. However, in this example, the second data point can include a receipt time 216c of 12:16:18, over 13 minutes after the end of the applicable window 216b. This delay in receipt of the data point can result in either a delay in publication of data points in the applicable window 216b or leaving out the data point from being published with other data points in the applicable window 216b.

The max delay 208 can provide a maximum delay time (e.g., a delay from a receipt time for a data point and an end of the applicable window that the data quantizer system will wait to publish data points in the applicable window. In the example as illustrated in FIG. 2, the maximum delay is static, where a greatest detected delay for a time duration (e.g., for the past hour) is the maximum delay. For example, after receipt of the first data point 214, the maximum delay 214d can include 5 seconds (e.g., the difference between the window publishing time 214e of the data point and the end of the applicable window (e.g., 12:01) 214b.

Further, in this example, the receipt of the second data point can increase the maximum delay value. For instance, the second data point 216 has a receipt time 216c of 12:16:18, which provides a 14 minute delay between the receipt time 216c and the publishing time 216e (e.g., 12:17:05) after the end of the applicable window 216b (e.g., 12:03). Accordingly, after receipt of the second data point, the max delay 208 can be updated to 14 minutes.

In this example, as no other detected delay exceeds 14 minutes, the max delay 208 remains at 14 minutes until a delay reset 220 at 01:00. Accordingly, even if the delay from the end of the applicable window 212 on average drops below the maximum delay, the max delay 208 remains the same. For instance, a third data point 218 includes a delay form the end of the applicable window 218f of 1 minute.

The static maximum delay value as represented in the example in FIG. 2 can negatively impact the balance between completeness and timeliness. For instance, if the max delay 208 increases to 14 minutes, this may allow for excessive delay in publishing data points in applicable windows 204. A large static maximum delay can result in completeness being favored over timeliness, causing delays in publishing data points and presentation of the data points by the streaming analytics system.

In the present embodiments, the data quantizer system can dynamically adjust maximum delay value based on a statistical model for the time series of data points. FIG. 3 provides a second example table 300 representing publication of data points with a dynamically modified maximum delay value. As shown in FIG. 3, rather than a static max delay, the time series of data points can include a set of adjusted max delay values 308. The set of adjusted max delay values 308 can include one or more detected maximum delay values and associated time to live values for each of the detected maximum delay values derived from a statistical model as described herein.

For instance, a first data point 314 can include a first delay from an end of the applicable window 314f of 5 seconds, and the set of adjusted max delay values 314d can include the 5 second delay. In this example, responsive to a second data point 316 having a delay 316f of 14 minutes, the delay can be added to the set of adjusted max delay values 316d (e.g., 5 seconds, 5 seconds, 14 minutes). A derived time to live value can be assigned to the 14 minute delay such that the 14 minute delay value is removed from the set of adjusted max delay values after expiry of the time to live value. Further in this example, after expiry of the time to live value (2 minutes) the adjusted max delay values 308 can remove the 14 minute delay value and replace it with a delay 312 detected for a next data point. This allows for dynamic adjustment of the maximum delay for the time series of data points, providing greater balance between completeness of published data and timeliness in publishing the data points.

In the example as illustrated in FIG. 3, a set of maximum delay values (e.g., adjusted max delay values 308) can specify a maximum delay for the time series of data points. For instance, a first data point 314a can include a data point raw time of 12:00 and a data point receipt time 314c of 12:00:18. The applicable window of data points can be published (e.g., 314e) at 12:01:05, comprising a 5 second delay from the end of the applicable window (e.g., 314f). In this example, a second example data point can include a delay from the end of the applicable window of 5 seconds, which can be added to the set of maximum delay values. The set of maximum delay values can include a predetermined number of values, such as three values, for example.

In this example, a third data point can include a data point raw time 316a of 12:02 and a data point receipt time 316c of 12:16:18, which comprises a delay of 14 minutes. Accordingly, a delay from an end of the applicable window 316f can include 14 minutes, which can be added to the set of adjusted delay values 316d.

As described above, each maximum delay value in the set of maximum delay values can include a time to live (ttl) value, indicating a time for each maximum delay value to remain in the set of maximum delay values. Further, as a maximum delay value deviates from a weighted average delay value and a delay variance value, the ttl value can be lower, allowing for a shorter time for an anomalous delay value to remain in the set of maximum delay values. In the present example, the 14 minute delay value added in the set of maximum delay values 316d can include a short time to live value (e.g., 2 minutes) to remove the value after the expiration of the ttl value. For instance, at a later time point 2 minutes after the addition of the 14 minute delay into the set of adjusted max delay values 316d, the ttl value for the 14 minute delay value can expire (e.g., 318), thereby removing the 14 minute delay value for a subsequently-derived delay value (7 seconds). This process can be repeated to remove any anomalous delay values and bring the adjusted delay values 308 near the weighted moving average delay.

The adjusted max delay values 308 can be dynamically modified based on a statistical model to bring the maximum delay values near a weighted moving average delay and delay variance. This can allow for window publishing times 210 to be published near an end of an applicable window 204, balancing timeliness and completeness of data provided to a streaming analytics system providing near real-time data analysis.

2.2. Overall Process

Figure 4:
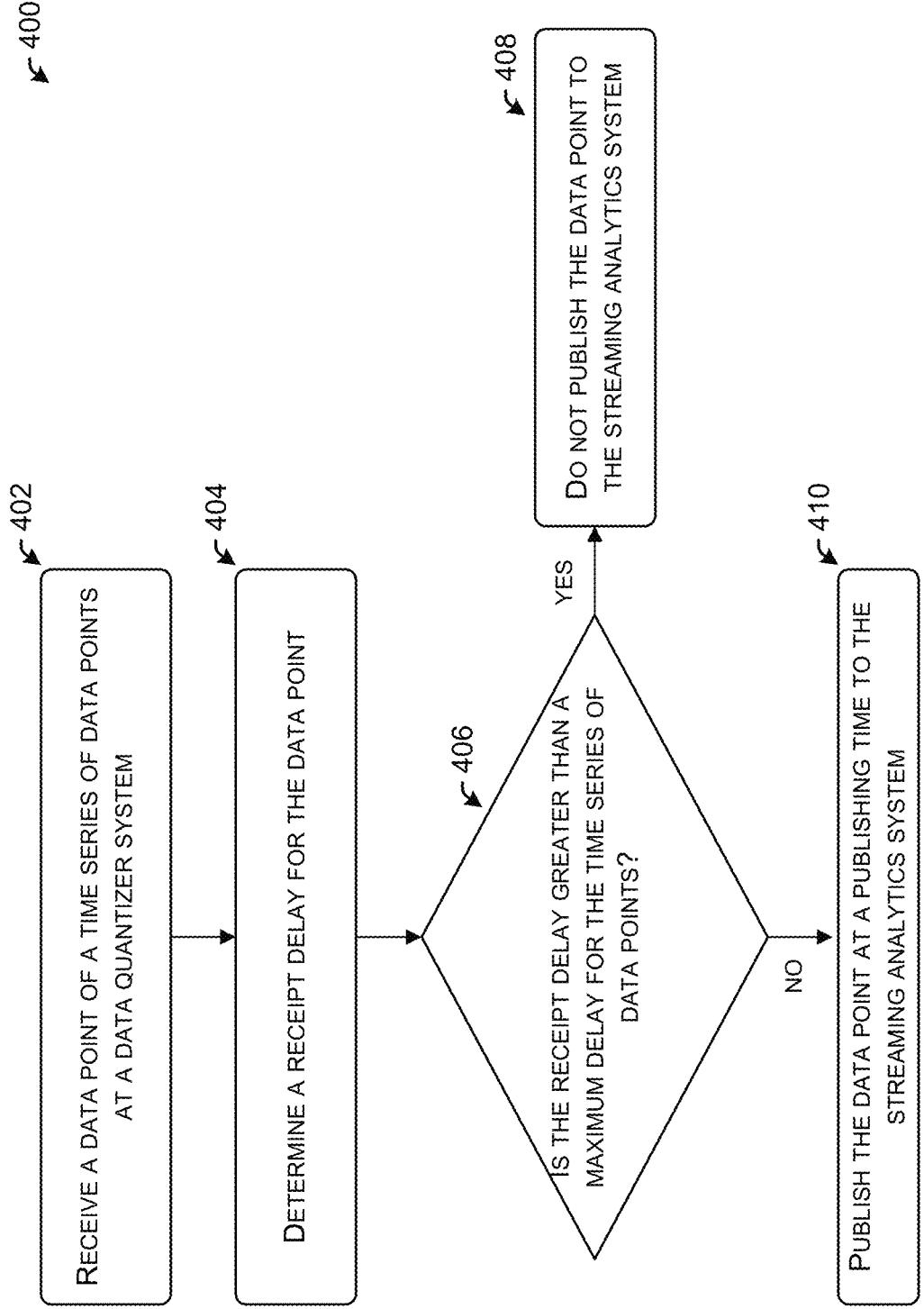
FIG. 4 provides an overview of an example process for publishing time series data points based on a max delay.

FIG. 4 is a flowchart 400 for a process of publishing data points based on a maximum delay for the time series of data points. As noted above, a maximum delay is a threshold time for data to be published.

At 402, the data quantizer system can receive a data point of a time series of data points. For instance, the data quantizer system can receive the data point from a client device via a communication network and extract metadata for the data point. Metadata for the data point can include a data point raw time (e.g., 202), a data point receipt time (e.g., 206), and an applicable window (e.g., 204), for example.

At 404, the data quantizer system can determine a receipt delay time for the data point. The first receipt delay time can include a delay between the receipt time and a window publishing time associated with the data point.

As an illustrative example, a data point can have a raw time of 12:00 and an applicable window of 12:00-12:01. In this example, the data point can include a receipt time of 12:01:20. The data quantizer system can then determine a receipt delay of 20 seconds (e.g., the receipt time less than the end of the applicable window.

At 406, the data quantizer system can determine whether the receipt delay is greater than a maximum delay for the time series of data points. In the example provided above, if the receipt delay is 20 seconds and the maximum delay is 1 minute, the data point is published at a publishing time to a streaming analytics system (e.g., at 410). However, if the receipt delay is 20 seconds but the maximum delay is 10 seconds, the data point is not published to the streaming analytics system (e.g., at 408). The maximum delay can balance the completeness of data points being published to the streaming analytics system and timeliness in publishing the data points to the streaming analytics system.

At 408, if receipt delay is greater than max delay, the data point is not published to the streaming analytics system. Such late data points can be dropped because of the maximum delay and maintaining timeliness in publishing data points. Rather, the data point can be stored in a storage module (e.g., data storage 160) for subsequent analysis/query.

At 410, the data point can be published at the publishing time to the streaming analytics system. Data points for each applicable window can be published at a publication time occurring after the end of the applicable window. For example, if the applicable window closes at 12:01:00, the data can be published at a publication time of 12:01:05. Publishing data point associated with the applicable window can allow for the streaming analysis system to provide one or more graphical interfaces providing a representation of the one or more data points for near real-time analysis.

2.3. Dynamic Max Delay Adjustment Overview

Figure 5:
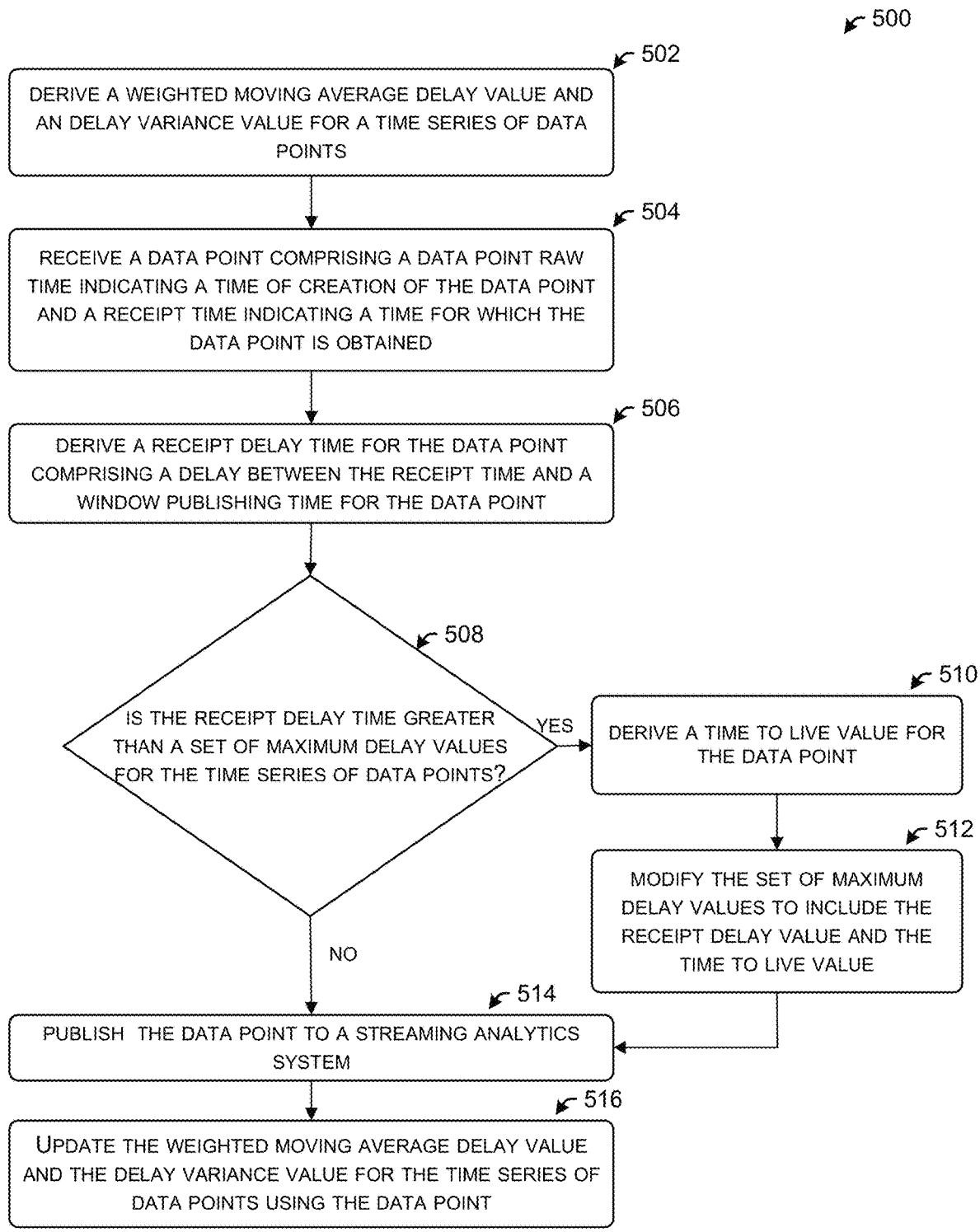
FIG. 5 provides an overview of an example process for dynamically adjusting a maximum delay for time series data points.

FIG. 5 provides a flow process 500 of an example method for dynamically adjusting a maximum delay for a time series of data points. As described herein, the maximum delay can be adjusted using a statistical model that incorporates a weighted moving average delay and a delay variance for the time series of data points.

At 502, the data quantizer system can derive a weighted moving average delay value and a delay variance value for the time series of data points. The weighted moving average delay can include an average delay for the data points during a specified time duration. For example, if a series of data points each include a delay of 5 seconds, the weighted moving average delay can be 5 seconds. However, in this example, if a subsequent data point has a delay of 10 minutes, the weighted moving average delay can increase due to the increased delay time.

The delay variance value can include a deviance between detected delay values in the time series of data points. In the example above, for a series of data points each including a delay of 5 seconds, the delay variance value can increase upon detecting a subsequent data point having a delay of 10 minutes. The weighted moving average delay and the delay variance can be utilized in deriving a time to live value for a delay added to a set of maximum delay values, as described below. Deriving the weighted moving average delay and the delay variance is discussed in greater detail with respect to FIG. 6A.

At 504, the data quantizer system can receive a data point. The data can include a data point raw time (e.g., 202 in FIG. 2) indicating a time of creation of the data point and a receipt time (e.g., 206 in FIG. 2) indicating a time for which the data point is obtained. The data quantizer system can process metadata included in the data point to derive the data point raw time and identify the time series of data points for the received data point.

At 506, the data quantizer system can derive a receipt delay time for the data point. The receipt delay time can comprise a time duration (e.g., a delay) between the receipt time (e.g., 206 in FIG. 2) and the end of the applicable window (e.g., applicable window 204 in FIG. 2). For example, the data point can include a raw time of 12:00 (and an applicable window between 12:00 and 12:01) and a receipt time of 12:01:05. In this example, the receipt delay time can comprise 5 seconds (e.g., the receipt time (12:01: 05) less than the end of the applicable window 12:01).

At 508, the data quantizer system can determine if the receipt delay time is greater than a set of maximum delay values for the time series of data points. As noted above, the set of maximum delay values can include one or more (e.g., three) maximum receipt delay times detected for data points in the series of data points. Any of the set of maximum delay values can include a corresponding time to live value specifying a time of expiration of the value included in the set of maximum delay values. Determining if the receipt delay time is greater than the set of maximum delay values can include identifying if the receipt delay time is greater than any value included in the set of maximum delay values. In some instances, if any of the values included in the set of maximum delay values are removed (e.g., due to a corresponding time to live time expiring), the receipt delay time can be added to the set of maximum delay values as described herein.

At 510, the data quantizer system can derive a time to live (ttl) value for the data point. The ttl value can be derived based on the receipt delay value and the weighted moving average delay and the delay variance. Particularly, a z-score can be derived based on the receipt delay, weighted moving average delay, and the delay variance, such that a larger deviance of the receipt delay from the average delay and variance lowers the ttl value for the data point and faster expiration of the delay from the set of maximum delay values. Deriving the ttl value for the data point is discussed in greater detail with respect to FIG. 6B.

At 512, the data quantizer system can modify the set of maximum delay values to include the receipt delay value and the derived time to live value. For instance, a lowest delay value in the set of maximum delay values can be removed for the receipt delay value and the derived time to live value. The time to live value can provide a time of expiration for the receipt delay value from the set of maximum delay values. Responsive to the time to live value expiring, the corresponding delay value can be removed from the set of maximum delay values and replaced with a newly-derived delay value.

At 514, the data point can be published to a streaming analytics system. One or more data points in the time series of data points that correspond to the applicable window can be published to the streaming analytics system at a time after the end of the applicable window (e.g., window publishing time 210). The streaming analytics system can present one or more graphical interfaces providing a graphical representation of the time series of data points.

At 516, the weighted moving average delay value and the delay variance value for the time series of data points can be updated using the data point. The weighted moving average delay value and the delay variance value for each data point, providing continuously-updated metrics for the time series of data points. Updating the moving average delay value and the delay variance value is discussed in greater detail with respect to FIG. 6A.

2.4. Weighted Moving Average Delay and Delay Variance Derivation

As noted above, a weighted moving average delay and a delay variance can be updated for each data point received at the data quantizer system. FIG. 6A illustrates a process 600a to derive both the weighted moving average delay and a delay variance for a time series of data points.

At 602, a delta value can be derived as a delay less than an initial instance of the weighted moving average delay. The weighted moving average delay can include a difference between the receipt time for the data point (e.g., 206 in FIG. 2) and a raw time for the data point (e.g., 202 in FIG. 2). The delay can represent a time duration between creation of the data point and receipt of the data point at the data quantizer system.

At 604, an updated instance of the weighted moving average delay can be derived as a summation of the initial instance of the weighted moving average delay and a product of the delta value (as derived in 602) and an alpha value. The weighted moving average delay can be continually updated for each data point, providing a rolling average delay identified in the time series of data points. The alpha value can comprise a value between 0 and 1 to make the calculation of the updated instance of the weighted moving average delay less sensitive to anomalous delay values detected for the time series of data points.

At 606, an updated instance of the delay variance can be derived. The delay variance can quantify a spread of delay values for the time series of data point and can be indicative of an abnormality of a given data point. The updated instance of the delay variance can include a product of the alpha value and an initial instance of the variance value, the alpha value, and the delta value squared.

2.5. Time to Live Value Derivation

As described above, responsive to a delay for a data point exceeding any of a set of maximum delay values, the maximum delay values can be updated with the delay for the data point with a time to live value. The time to live value can specify a time that the delay is included in the set of maximum delay values such that the delay is removed from the set of maximum delay values responsive to expiration of the time to live value. The time to live value can be modified based on a deviance of the delay relative to the moving average delay and delay variance such that an anomalous delay value can be quickly removed from the set of maximum delay values. FIG. 6B provides a process 600b for deriving a time to live value for a data point to be included in a set of maximum delay values.

At 608, a z-score can be derived. The z-score can measure how outlying or anomalous the current delay value is relative to previous delay values in the time series of data points. The z-score can include a value comprising a quotient of the delay value and the weighted moving average delay and a square root of the delay variance.

At 610, the time to live value can be derived. The time to live value can include a quotient of a maximum expiry time and a maximum of 1 and the z-score. The maximum expiry time (maxExpiryTime) can set an upper bound for a ttl value to guarantee that the delay value is to expire after the maximum expiry time. Similarly, a minimum expiry time (minExpiryTime) can set a lower bound for the ttl value. In some instances, a delay value that is close to the weighted moving average delay may include a ttl value close to the maxExpiryTime.

At 612, if the ttl value is less than the minExpiryTime, the ttl value can comprise the minExpiryTime. This can prevent a ttl value being below a threshold time and frequent. Any of the maxExpiryTime and minExpiryTime can be configurable and modified based on trends in the receipt delays for a time series of data points.

At 614, the set of maximum values can be updated to include the delay value and the time to live value. For instance, a smallest delay value included in the set of maximum delay values can be replaced with the delay value and the ttl value for the data point. In some instances, responsive to a delay value being removed from the set of maximum delay values (e.g., due to expiration of a corresponding ttl value), the delay value and the ttl value for the data point can be added to the set of maximum delay values.

2.6. System Overview

Figure 7:
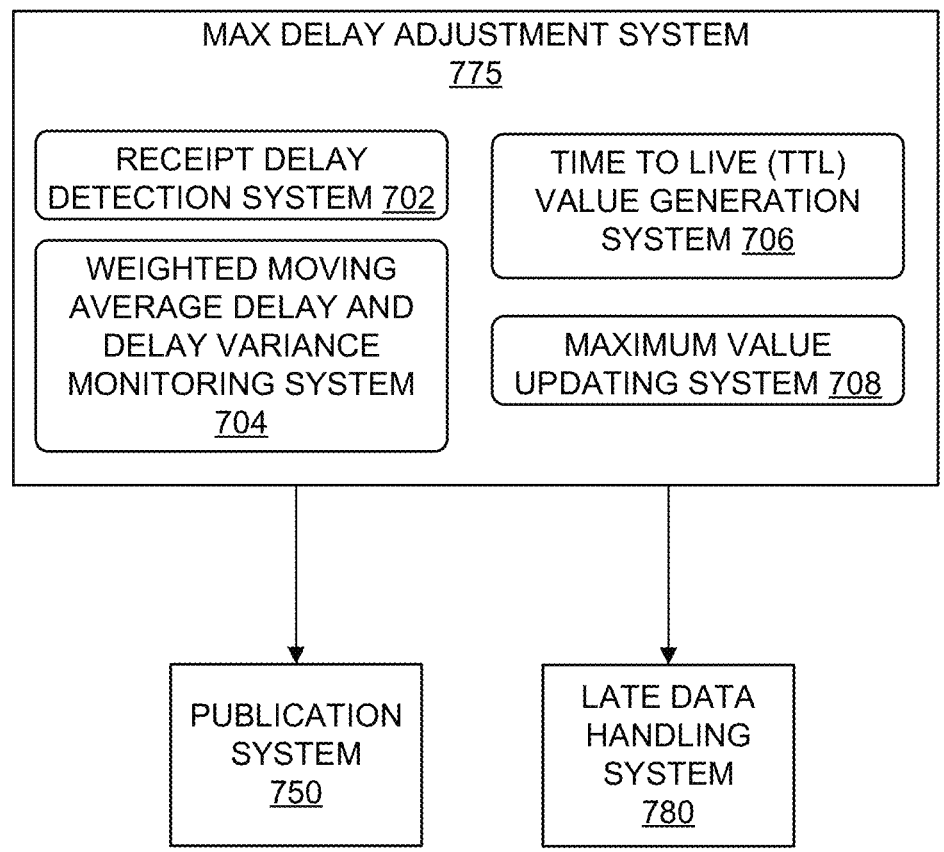
FIG. 7 provides a block diagram of an example max delay adjustment system.

FIG. 7 is a block diagram of an example max delay adjustment system 775, which can be the same as max delay adjustment system 175, or it can be different. As noted with respect to FIG. 1, max delay adjustment system 775 can be included in a data quantizer system 120. The max delay adjustment system 775 can dynamically adjust a set of maximum delay values based on detected delays in a time series of data points as described herein.

The max delay adjustment system 775 can include a receipt delay detection system 702. The receipt delay detection system 702 can derive a receipt delay (e.g., 212 in FIG. 2) comprising a difference between the receipt time of the data point and a raw time of the data point. The data quantizer system 120 can process the data point to identify the meta data for the data point, such as identifying the data point raw time (and corresponding applicable window) and assigning a receipt time for the data point. Determining the receipt delay is discussed in greater detail with respect to 404 in FIG. 4.

The max delay adjustment system 775 can also include a weighted moving average delay and delay variance monitoring system 704. The weighted moving average delay and delay variance monitoring system 704 can continually update the weighted moving average delay and delay variance for each received data point. For instance, as the delay values change for data points, the weighted moving average delay and delay variance values may be modified for the time series of data points. The weighted moving average delay and delay variance can be used in generation of a ttl value as described herein. Updating the weighted moving average delay and delay variance values for a data point is described in greater detail at 516 in FIG. 5.

The max delay adjustment system 775 can also include a time to live (ttl) value generation system 706. The time to live (ttl) value generation system 706 can generate a ttl value responsive to determining that the receipt delay exceeds any of a set of maximum delay values for the time series of data points. Generation of the ttl value is discussed in greater detail at 510 in FIG. 5 and at FIG. 6B.

The max delay adjustment system 775 can also include a maximum value updating system 708. The maximum value updating system 708 can maintain and update a set of maximum delay values comprising the maximum delay for the time series of data points. The maximum value updating system 708 can also monitor ttl values for the set of maximum delay values and remove a delay value responsive to a corresponding ttl value expiring. Updating the set of maximum delay values is discussed in greater detail in 512 of FIG. 5.

The max delay adjustment system 775 can provide the set of maximum delay values to each of a publication system 750 and a late data handling system 780. The publication system 750 may be the same as the publication system 150 depicted in FIG. 1, or it may be different. The late data handling system 780 may be the same as the late data handling system 780 depicted in FIG. 1, or it may be different. In some examples, the publication system 750 can utilize the set of maximum delay values for publishing data points (e.g., by sending the data points to the streaming analytics service and/or storing the data points). The late data handling system 780 can also utilize the set of maximum delay values in determining an operation to perform with respect to a data point received after an end of an applicable window, for example.

3.0. Processing of Data Points Received after Max Delay

As described above, the data quantizer system 120 can include a late data handling system 180. The late data handling system can analyze data points that are received after the close of the window to which the data points are assigned to determine if they should be added to the assigned window or if they should be dropped. For example, in some cases, data points that arrive after the close of the assigned window or after the publication time for the assigned window (e.g., late data points) might normally be dropped, but circumstances may dictate that it may be appropriate to instead add the late data to the assigned window, such as if the late data points are received in an in-order condition. This can be beneficial for allowing a late data point to be added to an assigned window and dropping fewer late data points, particularly where the late data point or data points being added to the assigned window do not impact the validity, quality, or accuracy, of the other data points in the assigned window or other data points in other windows.

Figure 8:
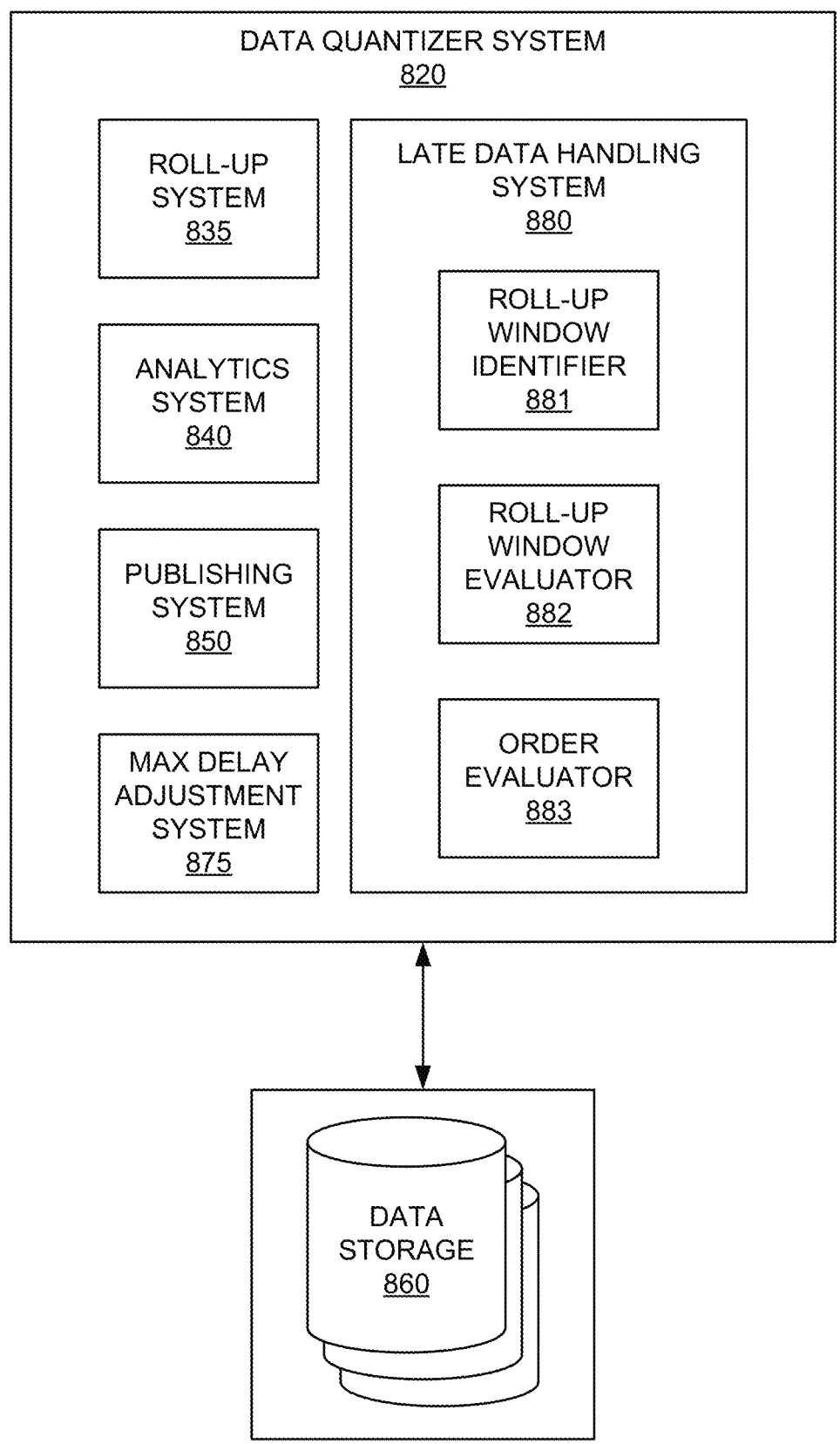
FIG. 8 provides a block diagram of an example data quantizer system for evaluating late received data points.

Late arriving data can be caused by a variety of circumstances. For example, data may be delayed during transmission over a network, such as in the case of FIG. 8 shows an overview of an example data quantizer system 820 for collecting, analyzing, processing, and storing time series data, and particularly for evaluating late data points and, if appropriate, for analyzing, processing, and/or storing the late data points. Data quantizer system 820 can correspond to or be the same as the data quantizer system 120 depicted in FIG. 1, or it can be different. As illustrated in FIG. 8, data quantizer system 820 includes a roll-up system 835, an analytics system 840, a publishing system 850, a max delay adjustment system 875, and a late data handling system 880. Without limitation, data quantizer system 820 may optionally further include one or more of an intake system, a metadata system, a time series storage, a metadata storage, or other systems, subsystems, or components, but such components are not shown in FIG. 8 so as not to obscure other details. Late data handling system 880 is further shown as including a roll-up window identifier 881, a roll-up window evaluator 882, and an order evaluator As described above, time series data can correspond to a series of data points each having an associated raw time, as assigned by the particular data source from which it originates. The data points can be received at the quantizer system 820 and be assigned a receipt time, such as by an intake system. The receipt time can be used by the roll-up window identifier 881 to identify the roll-up window for any received data point. In some examples, the roll-up system 835 may establish various roll-up windows, such as based on the various roll-up data points the roll-up system 835 is determining. For example, for time series data generated by a data source on a repeated 1 second basis and for which roll-up time series data are to be generated on various length roll-up windows, such as 15 second roll-ups, 1 minute roll-ups, 5 minute roll-ups, and 10 minute roll-ups, the roll-up system 835 may establish a series of roll-up windows for each of the roll-up time series data. These windows may be used, in association with the raw time of a data point, by roll-up window identifier 881 to determine which roll-up data point and roll-up window a late received data point should be assigned to.

The assigned roll-up window may further have a window close time, which may be determined based on the end time of the assigned roll-up window and a max delay value, which can indicate an additional amount of time after the end of a roll-up window for which the roll-up window is still open for receiving added data points and after which the roll-up windows closes. In some examples, the max delay value may be a fixed amount of time, and may be a fraction of the length of the roll-up window, or a multiple of the length of the roll-up window, such as in the case of a roll-up window the same or close to the time spacing between data points, or may be a specific fixed value. In some examples, the max delay value may be a variable or dynamically generated value, as described above, such as determined by the max delay adjustment system 875, which may be similar to or the same as the max delay adjustment system 175 or the max delay adjustment system 775, or it may be different.

Having the raw time for a received data point, the receipt time for the data point, the assigned roll-up window for the data point, and the window close time, the roll-up window evaluator 882 can determine if the roll-up window is open for adding the received data point. Such process can include identifying if the window close time is after the instant time or if the window close time is earlier than the instant time. Such process can include identifying if the window close time is earlier than the receipt time for the data point or if the window close time is later than the receipt time for the data point. In the event that the roll-up window is still open for receiving new data points (e.g., if the receipt time is earlier than the window close time), the data point can be simply added to the roll-up window. This situation corresponds to the normal circumstances for received data points that are not late (e.g., having a receipt time that is not later than the window close time). In such a case the data point may be passed to the roll-up system 835 for addition to the roll-up window or to the analytics system 840 for use in computing aggregated data.

In the event that the roll-up window is closed for receiving new data points, (e.g., if the receipt time is later than the window close time), further evaluation may be needed. In conventional practice, data points that are received after the close of a roll-up window may be handled in various ways. In one example, the data point may be assigned to and added to a following roll-up window if the receipt time is after the close of the originally assigned window or if the receipt time is after the publication time for the originally assigned window. In another example, the data point may be dropped. if the receipt time is after the close of the originally assigned window or if the receipt time is after the publication time for the originally assigned window.

However, in examples described herein, some data points may be added to their respective assigned windows despite having a receipt time that is after the close of the assigned window or having a receipt time that is after the publication time for the assigned window. For example, order evaluator 883 may analyze a late received data point to determine if the data point is received in an in-order condition or an out-of-order condition. As used herein, an in-order condition corresponds to state where a data point with a first raw time is received in sequence with other data points from the same time series data, arriving after other data points having raw times earlier than the first raw time. In some cases, an in-order data point having a first raw time may be received prior to other data points having raw times later than the first raw time. An out-of-order condition, in contrast, corresponds to a state where a data point with a first raw time is received after data points with later raw times. In some examples, order evaluator 883 may compare raw times for a data point being evaluated with raw times for other data points added to the assigned roll-up window to determine whether the raw time for the data point being evaluated is earlier or later than any of the raw times for the other data points in the roll-up window. When the data point being evaluated has a raw time after all other data points added to the roll-up window, the data point may be determined to be an in order condition and may be passed to the roll-up system 835 for addition to the assigned roll-up window or to the analytics system 840 for use in computing aggregated data. When the data point being evaluated has a raw time earlier than any other data points added to the roll-up window, the data point may be dropped.

FIG. 9 provides an example table 900 of characteristics for a sequence of data points in a time series data, showing the point raw times 902, assigned windows 904, window close times 906, window publishing times 908, data point receipt times 910, indicators of whether a data point is late (late indicator 912), indicators of whether a data point is received in an in-order condition or an out-of-order condition (order indicator 914), and indicators of whether a data point is to be added to the assigned window or dropped (add/drop indicator 916). Point numbers 918 are also indicated in the example table 900 for convenience of discussion herein, but point numbers may or may not be assigned or used by or in a data quantizer system.

In this example, a series of 15 data points are generated, once per second, and these data points are to be rolled-up in 5-second roll-up windows. The max delay in this example is fixed at 1 second, but as described above this can vary in other examples. Here, the window publishing time is fixed at 1 second after the window close time. For example, raw times 902 are indicated for each point; for point number 1 the raw time is 12:00:00, for point number 2 the raw time is 12:00:01, and so on. An assigned window 904 for each data point is determined, based on the raw time. For example, points 1-5, having raw times 12:00:00-12:00:04, are assigned to the window of 12:00:00-12:00:05, points 6-10, having raw times 12:00:05-12:00:09, are assigned to the window of 12:00:05-12:00:10, and so on. The window close time 906 for each point and window is indicated as 1 second after the window ends, and the window publishing time 908 for each point and window is indicated 2 seconds after the window ends and 1 second after the window closes. For example, the 12:00:00-12:00:05 window has a window close time of 12:00:06 and a window publishing time of 12:00:07, the 12:00:05-12:00:10 window has a window close time of 12:00:11 and a window publishing time of 12:00:12, and the 12:00:10-12:00:15 window has a window close time of 12:00:16 and a window publishing time of 12:00:17.

Data point receipt times 910 are indicated, with point numbers 1, 2, 6, 7, and 8 being received 1 second after their raw times, point numbers 4 and 5 being received 2 seconds after their raw times, point number 3 being received 3 second after its raw time, point number 15 being received 6 seconds after its raw time, point number 12 and 14 being received 7 seconds after their raw times, and point numbers 9, 10, 11, and 13 being received 8 seconds after their raw times.

Based on comparing the receipt times 910 and the window close times 906, points 1-8 are determined to be on time and not late, such that late indicator 912 for these points is "no"; for example, the receipt times 910 for points 1-8 is before the respective window close times 906. Based on comparing the receipt times 910 and the window close times 906, points 9-15 are determined to be late, such that late indicator 912 for these points is "yes"; for example, the receipt times 910 for points 9-15 are after the respective window close times 906.

Based on the receipt times 910 and the raw times 902, points 1-3, 5-10, and 12-15 are determined to be received in an in-order condition and points 4 and 11 are determined to be received in an out-of-order condition, as indicated in the order indicator 914. For example, point 1 is the first point received, so it is in-order, by default, since no other points with later raw times can have earlier receipt times at the time point 1 is received. At the time of receipt of points 2-3, 5-10, and 12-15, their raw times 902 are later than the raw times 902 for all other received points, so they are also in-order. At the time of receipt of points 4 and 12, however, their raw times 902 are earlier than the raw times for other received points. Looking at this from another perspective, ordering the points by their raw times gives: 1, 2, 3, 4, 5, 6, 7, 8, 9, 10, 11, 12, 13, 14, 15; ordering the points by their receipt times gives: 1, 2, 3, 5, 4, 6, 7, 8, 9, 10, 12, 11, 13, 14, 15. Comparing the order of these points shows that point 4 is received after point 5, but has a raw time before point 5. Similarly, point 11 is received after point 12, but has a raw time before point 12.

Based on the late indicator 912 and the order indicator 914, the add/drop indicators can be determined. For all points that are not late (e.g., where the late indicator 912 is "no"), these points can be added to their respective assigned windows. This will be the case for point 5, even though the order indicator for point 5 is "out-of-order." In some examples, when a window is open for adding new data points, the assigned data points can be added to the window even if they are received in an out-of-order condition. For the points that are late (e.g., where the late indicator 912 is "yes"), further evaluation of the order indicator 914 can be used to determine whether to add the points to their respective window or to drop the points. In some examples, for points that are late and are received in an in-order condition, these points can be added to their respective assigned windows (e.g., the add/drop indicator will be "add"). In some examples, for points that are late and are received in an out-of-order condition, these points can be dropped, meaning they are not added to their respective assigned windows.

Depending on the publishing time of the window, various situations may be performed by publishing system 850. For example, if a late received data point in an in-order condition is added to its assigned window before the window is published, the roll-up data point for the window can be determined by roll-up system 835 using the late received data point and subsequently published by publishing system 850. In such a situation, the publication can result in transmission of the roll-up data point to a streaming analytics system and/or storage of the roll-up data point to a data storage device, such as data storage 860. However, when publication occurs before receipt of a late data point in an in-order condition, the roll-up data point for the window can be initially determined by roll-up system 835 without using the late received data point and published by publishing system 850, such as where the roll-up data point (determined without using the late received data point) is transmitted to a streaming analytics system and/or stored to a data storage device, such as data storage 860. Once the late received data point in the in-order condition is added to its assigned window, a new roll-up data point for the window can be determined by roll-up system 835, now using the late received data point. Publication by publishing system 850 can result in the new roll-up data point being stored to a data storage device, such as data storage 860, optionally in place of the original roll-up data point determined without using the late received data point. In some cases, publishing system may not transmit the new roll-up data point to the streaming analytics system or may only transmit the new roll-up data point to the streaming analytics system on request.

Figure 10:
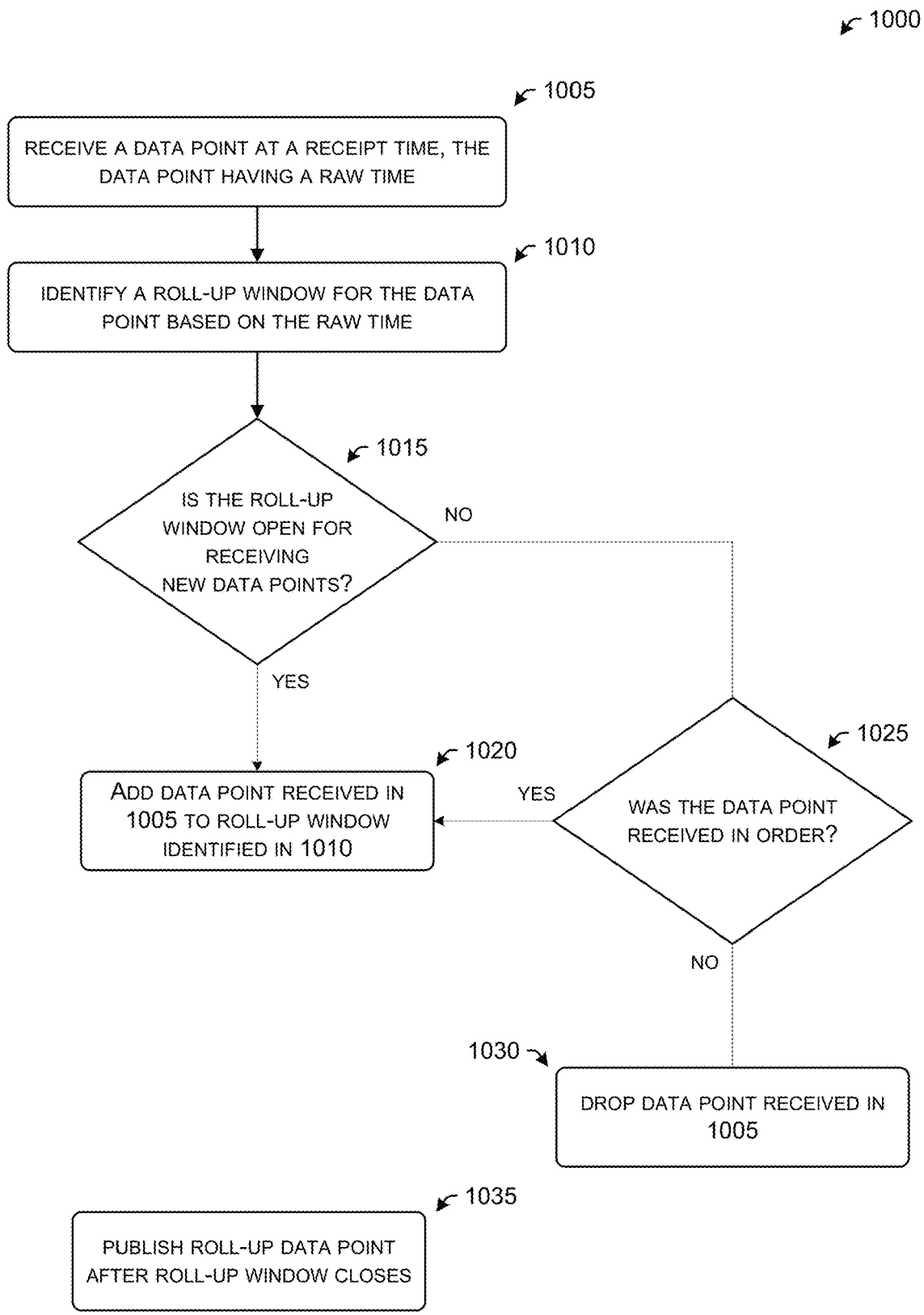
FIG. 10 provides an overview of an example process for evaluating late received data points.

Turning next to FIG. 10, a flow chart providing an overview of an example method 1000 is shown. Method 1000 begins at 1005, where a data point is received at a receipt time and has a raw time. As described above, the data point may be received at an intake system of a data quantizer system, for example. The raw time may be assigned by the origin data source and may be associated with a generation time for the data point or a transmission time for the data point, for example.

At block 1010, a roll-up window for the data point may be identified, such as based on the raw time. The roll-up window may correspond to an assigned roll-up window for the data point, which may be associated with one include one or more other data points. In some cases, start times and end times for the roll-up window may be determined. In some cases, a close time for the roll-up window may be determined.

At 1015, the roll-up window may be evaluated to determine if the roll-up window is open for receiving new data points. This may be performed by comparing the instant time with the roll-up close time, for example. This may be performed by comparing the receipt time for the data point with the roll-up close time. If the roll-up window is open for receiving new data points (e.g., if the receipt time is before the close time), then the process may branch to block 1020, where the data point can be added to the roll-up windows identified at block 1005. If the roll-up window is not open for receiving new data points (e.g., if the receipt time is after the close time), then the process may branch to 1025.

At 1025, the data point can be evaluated to determine if the data point is received in-order (e.g., if the data point is in an in-order condition or an out-of-order condition). Whether the data point is received in-order can be performed by comparing the receipt time of the data point with the receipt time of earlier received data points and determining if the receipt time of the data point is later than the receipt time of all the other earlier received data points. If the data point is received in-order, method 1000 can branch again to block 1020, where the data point can be added to the roll-up windows. If the data point is received out-of-order, the process can branch to block 1030, where the data point can be dropped (e.g., the data point can be explicitly not used for the roll-up windows). At block 1035, the roll-up data point can be published after the roll-up window closes.

Although method 1000 provides an overview of handling of data points for a single roll-up window, it will be appreciated that method 1000 may be applicable to multiple roll-up windows simultaneously, such that one or more or all aspects of method 1000 may be performed a plurality of times for a plurality of different roll-up windows. For example, if the data point corresponds to data generated once per second, the roll-up windows that may be identified at block 1010 may include a 5 second window, a 15 second window, a 1 minute window, and a 5 minute window. Each of these windows will be evaluated for determination if the rollup window is open for receiving new data points at block 1015. Where windows are open, the process may proceed to block 1020, as described above. For any windows that are closed, the process may proceed to block 1025, where the in-order state can be evaluated at block 1025 to determine whether to keep a late data point, as in block 1020 for in-order data points, or to drop the data point, as in block 1030 for out-of-order data points. Because the different roll-up windows may each have different close times, this may mean that a data point may be dropped for one roll-up window but added to another roll-up window.

4.0. Terminology

Computer programs typically comprise one or more instructions set at various times in various memory devices of a computing device, which, when read and executed by at least one processor, will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. Furthermore, use of "e.g.," is to be interpreted as providing a non-limiting example and does not imply that two things are identical or necessarily equate to each other.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrases "at least one of X, Y or Z" or "X, Y, and/or Z" as used in general is to convey that an item, term, etc. may be include X, Y or Z, or any combination thereof.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A computer-implemented method, comprising:
receiving, by a data quantizer system, a first data point of a time series of data points via a network, the first data point having a first data point raw time and received at a first data point receipt time;
identifying a first roll-up window for the first data point based on the first data point raw time;
determining that the first data point is received after the first roll-up window is closed;
determining that the first data point is received in an in-order condition based on at least the first data point receipt time;
in response to determining that the first data point is received after the first roll-up window is closed and that the first data point is received in an in-order condition, adding the first data point to the first roll-up window;
generating a first roll-up data point for the first roll-up window using the first data point and at least one other data point added to the first roll-up window;
storing the first roll-up data point to one or more non-transitory data storage devices;
receiving a second data point of the time series of data points via the network, the second data point having a second data point raw time and received at a second data point receipt time;
identifying a second roll-up window for the second data point based on the second data point raw time;
determining that second data point is received after the second roll-up window is closed;
determining that the second data point is received in an out-of-order condition based on the second data point raw time and the second data point receipt time;
generating a second roll-up data point for the second roll-up window using at least one other data point added to the second roll-up window and without using the second data point;
storing the second roll-up data point to the one or more non-transitory data storage devices;
receiving a third data point of the time series of data points via the network, the third data point having a third data point raw time and received at a third data point receipt time;
identifying a third roll-up window for the third data point based on the third data point raw time;
determining that third data point is received while the third roll-up window is open;
generating a third roll-up data point for the third roll-up window using the third data point and at least one other data point added to the third roll-up window; and
storing the third roll-up data point to the one or more non-transitory data storage devices.

2. The computer-implemented method of claim 1, further comprising:
storing the first data point to the one or more non-transitory data storage devices.

3. The computer-implemented method of claim 1, further comprising:
publishing the first roll-up data point generated using the first data point.

4. The computer-implemented method of claim 1, further comprising, prior to receiving the first data point:
generating the first roll-up data point for the first roll-up window without using the first data point; and
publishing the first roll-up data point generated without using the first data point.

5. The computer-implemented method of claim 1, wherein determining that the first data point is received after the first roll-up window is closed comprises determining that the first data point receipt time is later than a close time for the first roll-up window.

6. The computer-implemented method of claim 1, wherein determining that the first data point is received in an in-order condition comprises:
  determining that the first data point raw time is later than all other raw times for all other received data points of the time series of data points; or
  determining that no other raw time for any other received data point of the time series of data points is later than the first data point raw time.

7. The computer-implemented method of claim 1, wherein determining that the second data point is received in an out-of-order condition comprises:
  determining that the second data point raw time is earlier than at least one other raw time for any other received data points of the time series of data points.

8. The computer-implemented method of claim 1, wherein determining that the third data point is received while the third roll-up window is open comprises determining that the third data point receipt time is earlier than a close time for the third roll-up window.

9. A computing device, comprising:
  a processor; and
  a non-transitory computer-readable medium having stored thereon instructions that, when executed by the processor, cause the processor to perform operations including:
    receiving, by a data quantizer system, a first data point of a time series of data points via a network, the first data point having a first data point raw time and received at a first data point receipt time;
    identifying a first roll-up window for the first data point based on the first data point raw time;
    determining that the first data point is received after the first roll-up window is closed;
    determining that the first data point is received in an in-order condition based on at least the first data point receipt time;
    in response to determining that the first data point is received after the first roll-up window is closed and that the first data point is received in an in-order condition, adding the first data point to the first roll-up window;
    generating a first roll-up data point for the first roll-up window using the first data point and at least one other data point added to the first roll-up window;
    storing the first roll-up data point to one or more non-transitory data storage devices;
    receiving a second data point of the time series of data points via the network, the second data point having a second data point raw time and received at a second data point receipt time;
    identifying a second roll-up window for the second data point based on the second data point raw time;
    determining that second data point is received after the second roll-up window is closed;
    determining that the second data point is received in an out-of-order condition based on the second data point raw time and the second data point receipt time;
    generating a second roll-up data point for the second roll-up window using at least one other data point added to the second roll-up window and without using the second data point;
    storing the second roll-up data point to the one or more non-transitory data storage devices;
    receiving a third data point of the time series of data points via the network, the third data point having a third data point raw time and received at a third data point receipt time;
    identifying a third roll-up window for the third data point based on the third data point raw time;
    determining that third data point is received while the third roll-up window is open;
    generating a third roll-up data point for the third roll-up window using the third data point and at least one other data point added to the third roll-up window; and
    storing the third roll-up data point to the one or more non-transitory data storage devices.

10. The computing device of claim 9, wherein the operations further include:
  storing the first data point to the one or more non-transitory data storage devices.

11. The computing device of claim 9, wherein the operations further include:
  transmitting, via the network, the first roll-up data point generated using the first data point to one or more remote systems.

12. The computing device of claim 9, wherein the operations further include, prior to receiving the first data point:
  generating the first roll-up data point for the first roll-up window without using the first data point; and
  transmitting, via the network, the first roll-up data point generated without using the first data point to one or more remote systems.

13. The computing device of claim 9, wherein determining that the first data point is received after the first roll-up window is closed comprises determining that the first data point receipt time is later than a close time for the first roll-up window.

14. The computing device of claim 9, wherein determining that the first data point is received in an in-order condition comprises:
  determining that the first data point raw time is later than all other raw times for all other received data points of the time series of data points; or
  determining that no other raw time for any other received data point of the time series of data points is later than the first data point raw time.

15. A non-transitory computer-readable medium having stored thereon instructions that, when executed by one or more processors, cause the one or more processors to perform operations comprising:
  receiving, by a data quantizer system, a first data point of a time series of data points via a network, the first data point having a first data point raw time and received at a first data point receipt time;
  identifying a first roll-up window for the first data point based on the first data point raw time;
  determining that the first data point is received after the first roll-up window is closed;
  determining that the first data point is received in an in-order condition based on at least the first data point receipt time;
  in response to determining that the first data point is received after the first roll-up window is closed and that the first data point is received in an in-order condition, adding the first data point to the first roll-up window;

generating a first roll-up data point for the first roll-up window using the first data point and at least one other data point added to the first roll-up window;

storing the first roll-up data point to one or more non-transitory data storage devices;

receiving a second data point of the time series of data points via the network, the second data point having a second data point raw time and received at a second data point receipt time;

identifying a second roll-up window for the second data point based on the second data point raw time;

determining that second data point is received after the second roll-up window is closed;

determining that the second data point is received in an out-of-order condition based on the second data point raw time and the second data point receipt time;

generating a second roll-up data point for the second roll-up window using at least one other data point added to the second roll-up window and without using the second data point;

storing the second roll-up data point to the one or more non-transitory data storage devices;

receiving a third data point of the time series of data points via the network, the third data point having a third data point raw time and received at a third data point receipt time;

identifying a third roll-up window for the third data point based on the third data point raw time;

determining that third data point is received while the third roll-up window is open;

generating a third roll-up data point for the third roll-up window using the third data point and at least one other data point added to the third roll-up window; and storing the third roll-up data point to the one or more non-transitory data storage devices.

16. The non-transitory computer-readable medium of claim 15, wherein the operations further comprise:
storing the first data point to the one or more non-transitory data storage devices.

17. The non-transitory computer-readable medium of claim 15, wherein the operations further comprise:
transmitting the first roll-up data point generated using the first data point to one or more remote systems.

18. The non-transitory computer-readable medium of claim 15, wherein the operations further comprise, prior to receiving the first data point:
generating the first roll-up data point for the first roll-up window without using the first data point; and
transmitting the first roll-up data point generated without using the first data point to one or more remote systems.

19. The computer-implemented method of claim 1, wherein a data point raw time corresponds to a time at which a data point is generated by a remote computing device and wherein a data point receipt time corresponds to a time at which a data point is received by the computing device after being transmitted over the network.

20. The computer-implemented method of claim 1, further comprising:
transmitting, via the network, the first roll-up data point, the second roll-up data point, and the third roll-up data point to a streaming analytics system for displaying the first roll-up data point, the second roll-up data point, and the third roll-up data point on a graphical user interface.

21. The computer-implemented method of claim 1, wherein a difference between a data point raw time and a data point receipt time corresponds to at least a network latency for transmitting a data point over the network.

* * * * *